United States Patent [19]

Abo et al.

[11] Patent Number: 4,671,067

[45] Date of Patent: Jun. 9, 1987

[54] METHOD OF AND APPARATUS FOR CONTROLLING SUPERCHARGE PRESSURE FOR A TURBOCHARGER

[75] Inventors: Toshimi Abo, Yokohama; Takashi Ueno, Yokosuka, both of Japan

[73] Assignee: Nissan Motor Co., Ltd., Kanagawa, Japan

[21] Appl. No.: 772,687

[22] Filed: Sep. 5, 1985

[30] Foreign Application Priority Data

Sep. 5, 1984 [JP] Japan .................................. 59-185634

[51] Int. Cl.[4] .............................................. F02B 37/00
[52] U.S. Cl. ...................................................... 60/602
[58] Field of Search .................. 60/600, 601, 602, 603

[56] References Cited

U.S. PATENT DOCUMENTS 4,509,331 4/1985 Hirabayashi ........................... 60/602

FOREIGN PATENT DOCUMENTS 18522 3/1983 Japan ...................................... 60/602
58-176417 10/1983 Japan .
59-37228 2/1984 Japan .

Primary Examiner—Douglas Hart
Attorney, Agent, or Firm—Schwartz, Jeffery, Schwaab, Mack, Blumenthal & Evans

[57] ABSTRACT

A method of and an apparatus for controlling supercharge pressure for a turbocharger in which a proportional control or a proportional plus integral control is selectively carried out for controlling the capacity changing structure of an exhaust gas flow path to a turbine and for controlling an exhaust bypass valve which defines a bypass passage for the exhaust gas to flow around the turbine. Independent control loops are established having electromagnetic valves operated accordance with control signals having duty values calculated by a microprocessor in a control unit. According to the present invention, since independent control loops are established, no interference occurs between the control loops and no overlapping control conditions take place. Also overshoot control for the actual supercharge pressure due to excessive correction according is prevented by utilizing selective control by a proportional or a proportional plus integral scheme.

13 Claims, 7 Drawing Figures

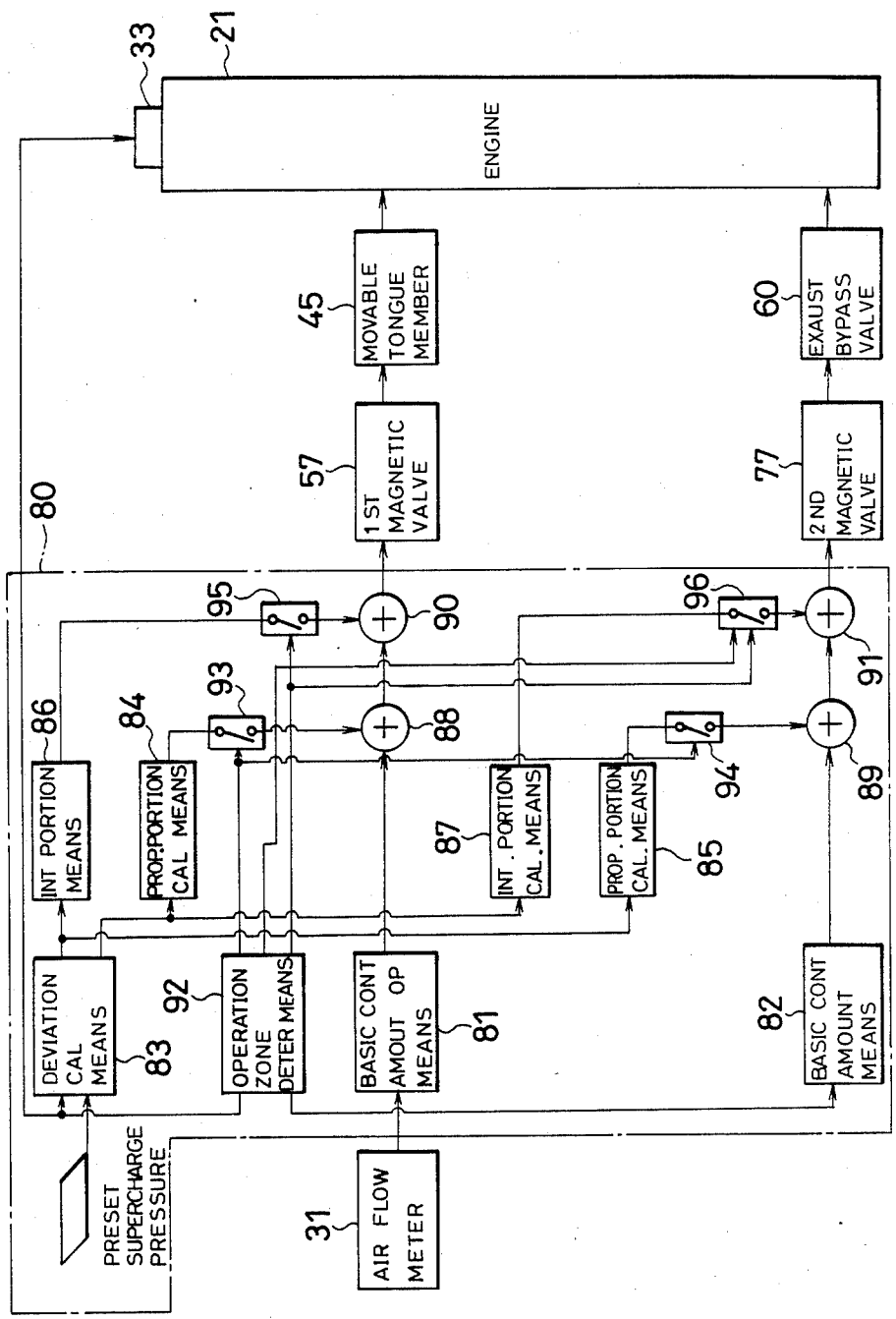

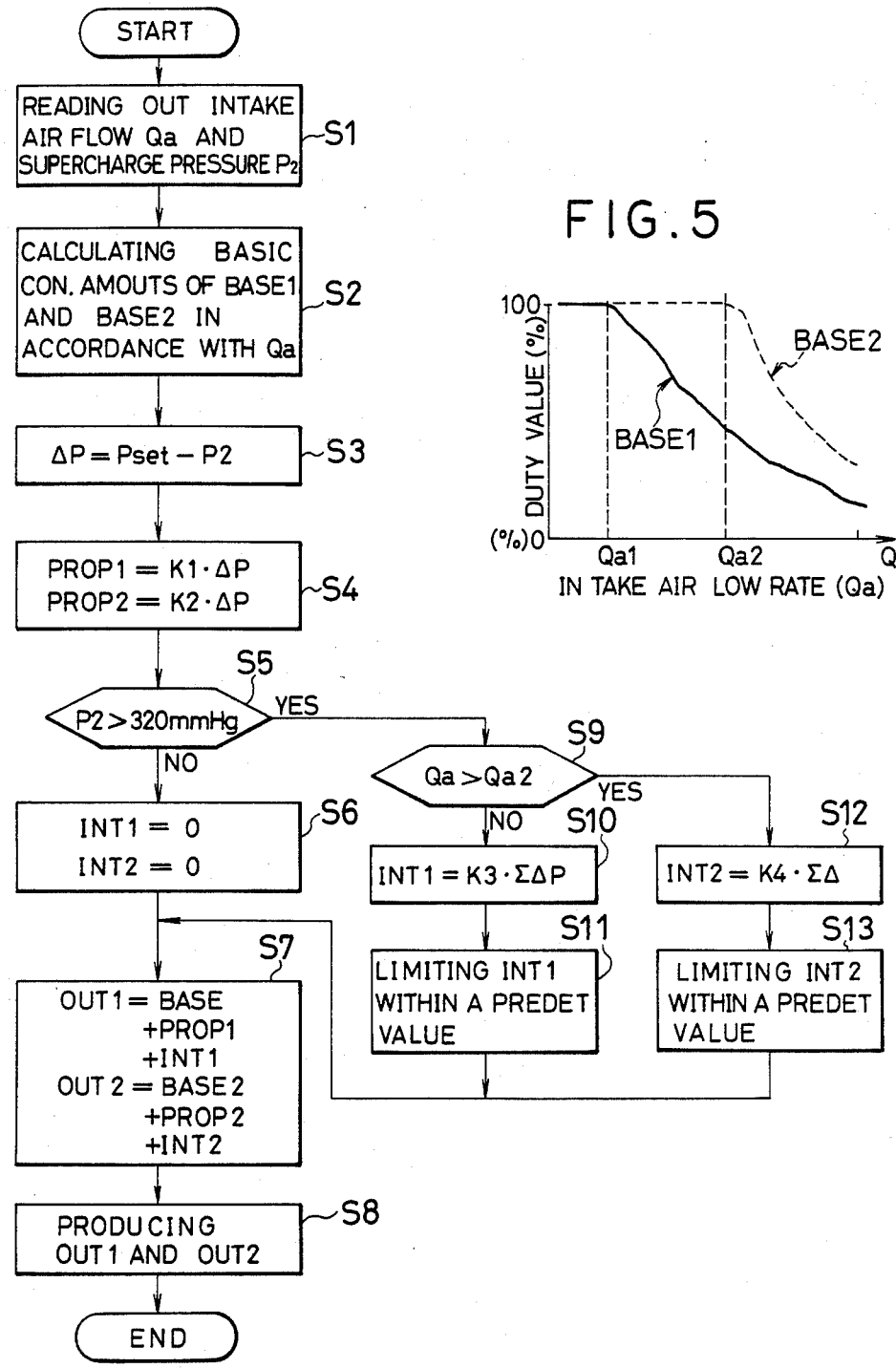

METHOD OF AND APPARATUS FOR CONTROLLING SUPERCHARGE PRESSURE FOR A TURBOCHARGER

BACKGROUND OF THE INVENTION

1. Field of the Invention

The present invention relates to a method of and an apparatus for controlling supercharge pressure for a turbocharger.

2. Description of the Prior Art

A turbocharger is constructed in such a manner that an exhaust turbine is rotated by exhaust gas at high temperature and high pressure so that the pressure within an intake manifold increases above atmospheric pressure, as the number of rotations of a compressor in the turbocharger increases. As a result, the supply of a large quantity of intake air to the engine becomes possible by the supercharge pressure thus obtained and with the result that high torque, high output can be obtained and an improvement of the fuel consumption can be obtained as well.

Now, in a car engine having a wide range of engine speeds, it is possible to sufficiently secure the supercharge pressure in middle and high speed operating zones. In the low speed operating zone, however, as it is diffiecult to obtain sufficient exhaust pressure and the torque will tend to also be low. In this case, it is known that the supercharge pressure in the lower speed operating zone is determined by the ratio A/R of the cross-sectional area A of a scroll and the radius R from the center of the scroll. Accordingly, if the cross-sectional area can be made small in the low speed operating zone where the exhaust gas flow rate is small, the supercharge pressure can be increased by increasing the number of turbine rotations.

To this end, a turbocharger having a variable capacity in which a capacity changing means is provided for varying the the ratio A/R of the turbine, has already been proposed by the same inventors named herein (see, for instance, Japanese Patent Application SN 58-162918). In the variable capacity turbocharger, sufficient supercharge pressure can be obtained even when the turbocharger is operated in the low speed operating zone.

In the supercharge pressure control of the turbocharger described above, a provision is made for an actuator for driving the capacity changing means of the turbocharger, with the supercharge pressure being a work pressure or operation pressure which is produced downstream of a compressor and the supercharge pressure is maintained constant by controlling the duty value of an electromagnetic valve which discharges the operating pressure to the outside.

In a control characteristic of the eletromagnetic valve where the X-axis indicated duty value (see, for instance, FIG. 5), the duty value signifies the opening time of the valve per a predetermined time and when it is 100 percent it indicates that the valve is fully opened and the cross-sectional area A is made to be a minimum, in this case by means of the actuator and the capacity changing means, so as to increase the number of turbine rotations.

On the other hand, when the duty value is zero, it indicates that the electromagnetic valve is fully closed, with the result that the sectional area A is made to be a maximum and the number of turbine rotations is suppressed, thus controlling the supercharge pressure to be a constant. In the actual control, in this case, in order to overcome the deviation of control involving different dispersion factors, it is a common practice to perform a feedback control in response to an actually detected value. In this example as well, the amount of feedback correction is calculated from the deviation between the actual supercharge pressure detected by a supercharge pressure sensor and a preset supercharge pressure.

The capacity changing means of the type described above is provided for the purpose of securing sufficient supercharge pressure in the low speed and low load operating zone of the engine. In the high load operating zone, however, the number of turbine rotations becomes too high to control the supercharge pressure. Accordingly, it is a common practice to provide at the down-stream of the turbine, an exhaust bypass valve for bypassing the pressure in the turbine inlet for discharging, so as to prevent the supercharge pressure from exceeding an allowable maximum pressure. However, the use of such a plurality of control means for controlling the supercharge pressure as described above will possibly result in unexpected disadvantages as a result of interference between the two controls. Namely, the capacity changing means and the exhaust bypass valve are both controls for the supercharge pressure so that the action of one control affects the other. For instance, when the capacity changing means is progressively closed, i.e., moved in the direction of increasing the supercharge pressure from an optimum value, and the exhaust bypass valve is moved toward an open position i.e., in the direction of suppressing the supercharge pressure from the optimum value, the supercharge pressure remains at a preset value as a whole.

In this manner, in order to achieve the object of maintaining the supercharge pressure at the present value there will be numerous approaches to realize the control of the capacity changing means and the exhaust bypass valve. However, in order for the engine performance to be at its maximum, it is necessary for the capacity changing means and the exhaust bypass valve to be set at their optimum positions respectively, while maintaining the supercharge pressure at the predetermined valve.

SUMMARY OF THE INVENTION

It is therefore an object of the present invention to provide method of controlling supercharge pressure for a turbocharger in which a feedback control is performed at a predetermined operating zone, respectively, by capacity changing means and by an exhaust bypass valve so as to avoid any interference of controls due to overlap of the feedback controls.

It is another object of the present invention to provide an apparatus for controlling supercharge pressure for a turbocharger in which each independent feedback control is performed in a respective predetermined zone by a plurality of control means for controlling the supercharge pressure and wherein no interference occurs since no overlapping control takes place.

It is a further object of the present invention to provide an apparatus for controlling supercharge pressure in which a capacity changing means for changing the exhaust gas amount to the exhaust turbine and an exhaust bypass valve are independently controlled in accordance with the operating conditions of the engine and the actual supercharge pressure, and a selection is made of a zone where the control is carried out by the capacity changing means and another zone where the control is carried out by the exhaust bypass valve.

It is still another object of the present invention to provide a method of and apparatus for controlling supercharge pressure in which a proportional control or a proportional plus intergral control is selectively performed on the actuators the capacity changing means and for the exhaust bypass valve means through independent control loops in accordance with control signals from an electronic control unit including a microprocessor.

One feature of the method of controlling supercharge pressure for a turbocharger according to the present invention is characterized in that it comprises the steps of: setting first predetermined value of supercharge pressure close to but below a preset supercharge pressure; independently performing proportional control for the capacity changing means for controlling exhaust gas flow to a turbine of a turbocharger and an exhaust bypass valve for bypassing the exhaust gas flow in a first zone beginning from the time of operating an accelerator until the actual supercharge pressure reaches said first predetermined supercharge pressure; performing a proportional plus integral control for only said capacity changing means for the turbine in a second zone beginning from the first predetermined supercharge pressure close to but below the preset supercharge pressure until the actual air flow rate reaches a first predetermined air flow rate, with the proportional control being maintained for the exhaust bypass valve; and performing the proportional plus integral control for only said exhaust bypass valve in a third zone after reaching said predetermined air flow rate, with the proportional control being maintained for the capacity changing means.

Another feature of the apparatus for controlling supercharge pressure for a turbocharger according to the present invention is characterized in that it comprises: a plurality of detecting means for detecting the operating conditions of the engine, such as air flow rate, supercharge pressure, throttle valve opening, and crank angle; capacity changing means provided at a guide path of an exhaust pipe and having a shaft member coupled through arm and rod means to a first actuator; and exhaust bypass valve provided at an exhaust manifold having linkage means including an arm and rods coupled to a second actuator; a first electromagnetic valve provided in a first liaison pipe for controlling said first actuator in accordance with a first control signal; a second electromagnetic valve provided a second liaison pipe for controlling said second actuator in accordance with a second control signal; and an electronic control unit having a microprocessor icluding a CPU, a ROM, and a RAM, an A/D converter, and an input/output interface for producing said first and second control signals and for selectively controlling said first and said second electromagnetic valves in accordance with the parameters of the operating conditions of the engine, detected by said plurality of detecting means.

These and other objects, features and advantages of the present invention will be better understood from the following detailed description of the embodiments with reference to the accompanying drawings.

BRIEF DESCRIPTION OF THE DRAWINGS

FIG. 4 illustrates a functional construction of the electronic control unit in FIG. 3, FIG. 5 illustrates the characteristics of a look-up table of duty value vs. intake air flow rate, the corresponding data which have preliminarily been stored in the ROM of a microprocessor of the control unit, FIG. 6 illustrates a program flow chart of the method of controlling supercharge pressure, according to the present invention.

DESCRIPTION OF PREFERRED EMBODIMENTS

Figure 1:
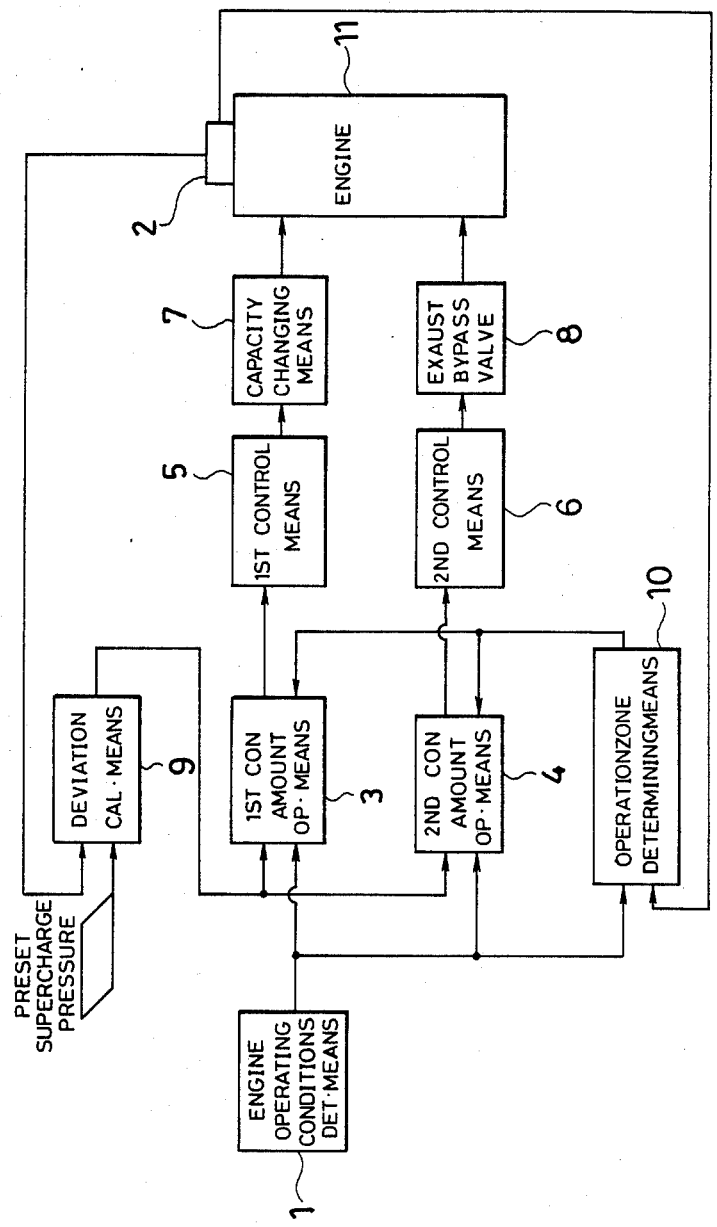
FIG. 1 illustrates a basic construction of the apparatus for controlling supercharge pressure for a turbocharger, according to the present invention.

Refering to FIG. 1, where a basic construction of the apparatus for controlling supercharge pressure for a turbocharger according to the present invention is shown, the apparatus comprises operating condition detecting means 1, supercharge pressure detecting means 2, first control amount operational means 3, second control amount operational means 4, first control means 5, second control means 6, capacity changing means 7, exhaust bypass valve means 8, deviation calculating means 9, operation zone determining means 10, and an engine 11.

The operating condition detecting means 1 detects the operating conditions of the engine 11. For instance, it detects intake air flow rate as one parameter representative of the operating conditions. The supercharge pressure detecting means 2 detects the actual supercharge pressure to be pressurized in a compressor not shown. The deviation calculating means 9 calculates the deviation between the actual supercharge pressure detected and target or preset supercharge pressure.

A plurality of control loops for controlling the supercharge pressure consists of a control loop for controlling the exhaust gas amount to an exhaust turbine not shown, which is varied by the capacity changing means 7 and another control loop for controlling the same through the exhaust bypass valve means 8. Namely, the first and second control amount means 3 and 4 calculate the control amount of the capacity changing means 7 and of the exhaust bypass valve means 8 for the turbine, respectively, in accordance with parameters representative of the operating conditions of the engine including at least the deviation. The first and second control means 5 and 6 control the capacity changing means 7 and the exhaust bypass valve means 8 in accordance with the control amounts calculated in the first and the second control amount operational means 3 and 4. With the plural control means for performing respective feedback control in accordance with the deviation, the actual supercharge pressure is controlled to equal the preset supercharge pressure.

The operation zone determining means 10 determines one operation zone to be feedback-controlled from another, e.g., it determines a predetermined operation zone in accordance with the intake air amount and the supercharge pressure detected by the supercharge pressure detecting means 2 and it permits the calculation of the control amount responsive to the deviation to be carried out selectively through either one of the first or the second control amount operational means 3 or 4, in accordance with the result of the determination.

With this construction according to the present invention, in an operation zone where the control is performed by the capacity changing means 7, calculation of a control amount can be carried out only by a first control amount operational means in accordance with the determined deviation, and the supercharge pressure control is carried out by the capacity changing means 7 in accordance with the control amount thus obtained.

Moreover, in another operation zone where the control is performed by the exhaust bypass valve 8, calculation of the control amount is carried out only by a second control amount operational means 6 in accordance with the determined deviation, and the supercharge pressure control is performed by the exhaust bypass valve 8 in accordance with the control amount thus obtained. As a result, in the system according to the present invention, since independent feedback control is carried out in respective predetermined zones by a plurality of control means for controlling the supercharge pressure and no overlapping control zones occur, no interference can be brought about between the independent control loops.

Figure 2:
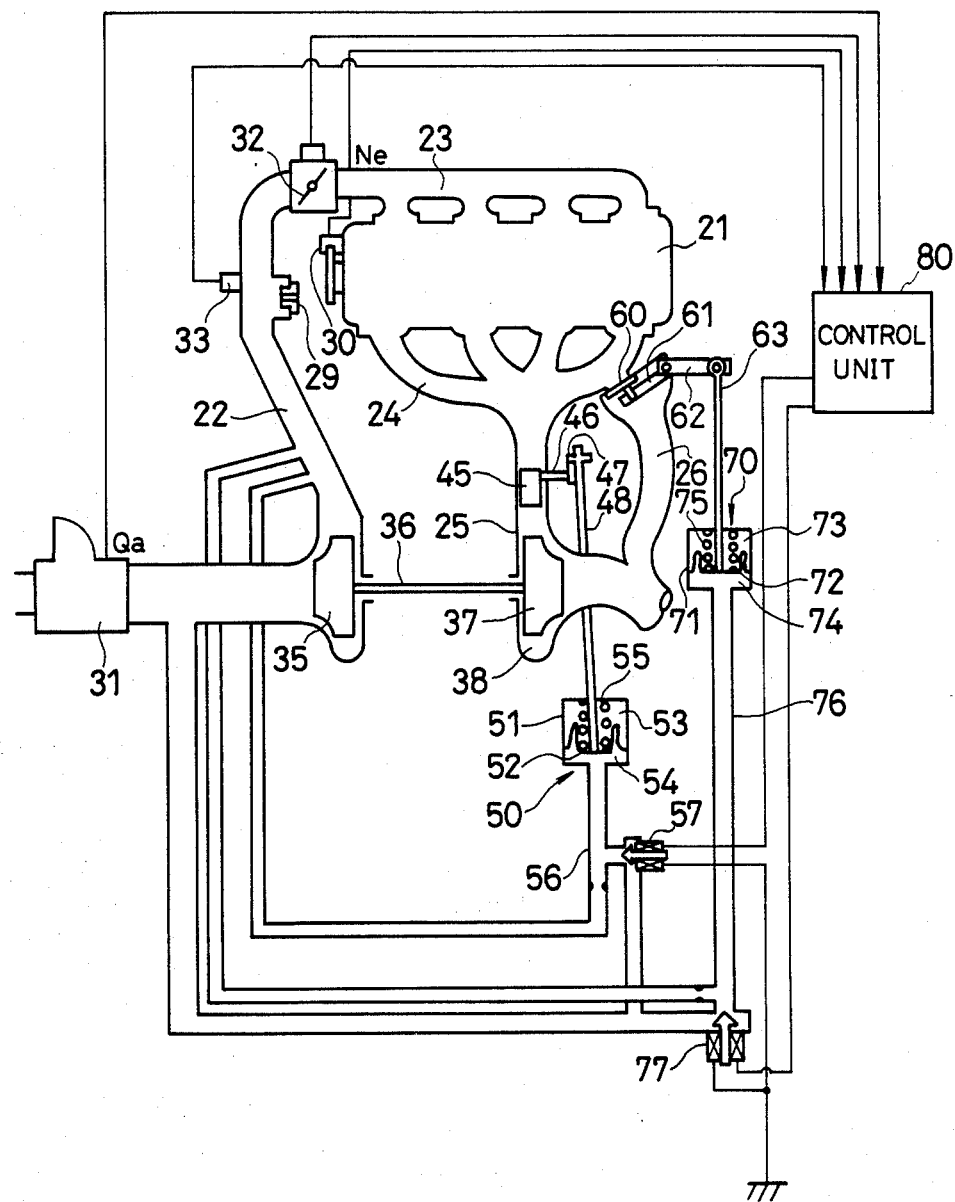
FIG. 2 illustrates an overall engine system having a turbocharger to which the method and apparatus according to the present invention are applied.

FIG. 2 shows an overall engine system having a turbocharger to which the present invention is applied. In the engine system, air is supplied to an engine 21 through an inlet pipe 22 and an inlet manifold 23 and exhaust gas is discharged through an outlet manifold 24 and an exhaust pipe 25.

At the end of the inlet pipe 22, there is provided an air flow meter 31 for measuring the inlet air flow rate Qa and at the opposite side of the inlet pipe 22, there is provided a compressor 35 which constitutes part of the turbocharger, which supplies the intake air from the air flow meter 31 to the engine 1 after pressurizing the air.

Figure 3:
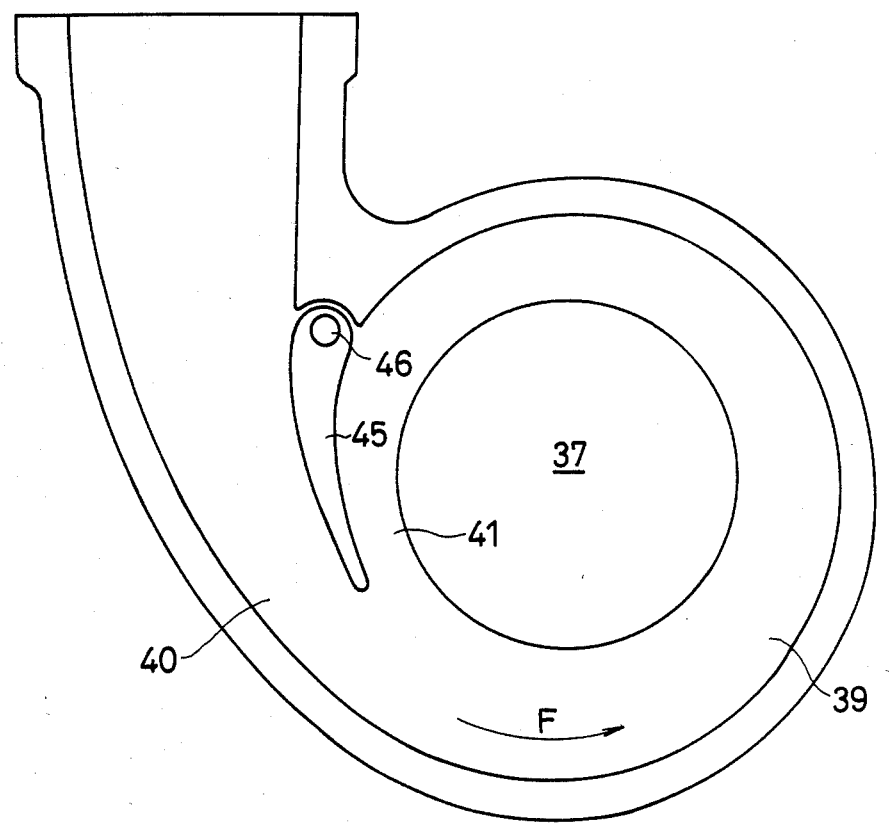
FIG. 3 illustrates an enlarged cross-sectional view of a scroll portion of the turbocharger, which has a movable tongue member as a capacity changing means.

At the base end portion of the inlet pipe 22 adjacent to the inlet manifold 25, there is provided a throttle valve 32 while a drain valve 29 is provided between the compressor 35 and the throttle valve 32. A turbine chamber 38 is formed at the bottom of the exhaust pipe 25 and a turbine 37 is provided within the turbine chamber 38, which is linked with the compressor 35 by a link shaft 36. The turbine chamber 38 is provided with a scroll 39 surrounding the turbine 37, as shown in FIG. 3. The scroll 39 is formed in such a manner that the cross-sectional area thereof is gradually reduced as it progresses down stream from a guide path 40 as shown by the arrow F.

At the confluence of the guide path 40 to the scroll 39 and the terminal end 41 of the scroll 39, there is provided a movable tongue 45 as a capacity changing means which constitutes a flap valve. The movable tongue 45 is pivotally supported by a shaft 46 so as to adjust the cross-sectional area of the guide path 40. The movable tongue 45 is provided within the exhaust pipe 25 in the figure near to the upstream side of the guide path 40 in the turbine 37. The shaft 46 pivotally supporting the movable tongue 45 is linked to the upper end of a rod 48 through an arm 47 and the lower end of the rod 48 is linked to a diaphragm 52 which constitutes an actuator 50 for driving the movable tongue 45.

A housing 51 having the diaphragm 52 is divided by the diaphragm 52 into an atmospheric chamber 53 and a positive pressure chamber 54. The atmospheric chamber 53 is provided with a spring 55 which is urged so as to push the diaphragm 52 toward the positive pressure chamber 54. The positive pressure chamber 54 is communicated with the inlet pipe 22 located downstream of the compressor 35 through a liaison pipe 56, so that the supercharge pressure produced by the compressor 35 is supplied to the positive pressure chamber 54 and it pushes the diaphragm 52 to the atmospheric chamber 53 against the spring 55.

Moreover, an electromagnetic valve 57 is provided between the inlet pipe 22 and the liaison pipe 56, which is, when operated, to be opened by a control signal from a control unit 80, and the liaison pipe 56 is communicated with the atmosphere through the electromagnetic valve 57. As a result, the pressure within the positive pressure chamber 56 lowers. Specifically, the electromagnetic valve 57 is duty-controlled by the control unit 80 in such a manner that the larger the duty value becomes, the larger the degree of opening of the electromagnetic valve 57 becomes, thus lowering the pressure in the positive pressure chamber 54. Accordingly, the diaphragm 52 is moved downward by the action of the spring 55 in the atmospheric chamber 53 and this movement is transmitted to the movable tongue 45 through the rod 48, the arm 47 and the shaft 46, thus permitting the movable tongue 45 to be pivoted in the direction of reducing the guide path 40 for the exhaust gas to the turbine 37, i.e., in the direction of closing the guide path 40. As a result, the flow speed of the exhaust gas to be supplied to the turbine 37 increases and the supercharge pressure of the compressor 35 to the engine 21 also increases.

On the other hand, the smaller the duty value becomes, the smaller the degree of opening of the electromagnetic valve 57 becomes and in turn the pressure in the positive pressure chamber 54 increases and then the diaphragm 52 is moved upward against the force of the spring 55, thus permitting the movable tongue 45 to make a pivotal movement in the direction of opening the guide path 40. As a result, the flow speed of the exhaust gas to be supplied to the turbine 37 decreases and the supercharge pressure supplied by the compressor 35 to the engine 21 also lowers.

A wast gate valve or exhaust bypass valve 60 is provided at the junction between an exhaust bypass path 26 for bypassing the turbine 37 and the exhaust manifold 24. The exhaust bypass valve 60 is linked to one end of a rod 63 which is linked to a diaphragm 72 in an actuator 70 so as to drive the bypass valve 60. A casing 71 having the diaphragm 72 is divided into an atmospheric chamber 73 and a positive pressure chamber 74 by the diaphragm 72. The atmospheric chamber 73 is provided with a spring 75 which is urged so as to push the diaphragm 72 toward the positive pressure chamber 74. The positive pressure chamber 74 is communicated with the inlet pipe 22 at the downstream of the compressor 35 through a liaison pipe 76 and the supercharge pressure produced by the compressor 35 is supplied to the positive pressure chamber 74.

Another electromagnetic valve 77 is provided at a liaison pipe 76 and when the electromagnetic valve 77 is opened by a control signal from the control unit 80, the liaison pipe 76 is communicated with the atmosphere through the electromagnetic valve 77, thus lowering the pressure within the positive pressure chamber 74. More specifically, the electromagnetic valve 77 is duty-controlled by the electronic control unit 80, so that the larger the duty value thereof becomes large, the larger the degree of opening of the electromagnetic valve 77 becomes. As a result, the pressure in the positive pressure chamber 74 lowers and the diaphragm 72 is moved downward by the action of the spring 75 within the atmospheric chamber 73. This downward movement of the diaphragm 72 is transmitted to the exhaust bypass valve or waste gate valve 60 through the rod 63, the linkage member 62, and the arm 61 and the valve 60 is operated in the direction of closing the bypass path 26.

On the other hand, the smaller the duty value becomes, the smaller the degree of opening of the electromagnetic valve 77 becomes so that the pressure in the positive pressure chamber 74 increases. As a result, the diaphragm 72 is moved upward against the spring 75 and the upward movement of the diaphragm permits the waste gate valve 60 to be operated in the direction of opening. The function of the valve 60 is to prevent the engine 21 from being damaged due to an excessive increase of the intake supercharge pressure supplied to the engine 21 when the engine 21 operates at a high speed, high load condition. To this end, part of the exhaust gas from the engine 21 is discharged to the outside and a suitable supercharge pressure is introduced into the engine 21 by reducing the exhaust gas to be supplied to the turbine 37.

The electronic control unit 80 comprises a microprocessor including a central processing unit (CPU), a random access memory (RAM), and a read only memory (ROM), an A/D converter, and an input/output interface (all are not shown). The detected signals from the air flow meter 31, the crank angle sensor 30, the throttle valve 32, and the supercharge pressure sensor 33 are applied to the control unit 80 and they are converted into digital data corresponding to the intake air flow rate Qa, the engine speed Ne, the throttle valve opening Q, and the supercharge pressure P2 through the A/D converter in the control unit in a well-known manner.

The microprocessor, not shown, in the control unit 80 calculates each of the suitable duty values of control signals to be applied to the electromagnetic valves 57 and 77 for driving the same, in accordance with the detected signals. As the result of controlling the electromagnetic valves 57 and 77, the movable tongue 45 is controlled and the cross-sectional area of the guide path 40 for the exhaust gas to the turbine 37 can be changed, and the amount of the exhaust gas to the turbine 37 is changed by the control of the waste gate valve 60. By these actions, the intake supercharged pressure to be supplied to the engine 21 is suitably controlled in response to the intake air flow rate Qa, thus increasing the torque from the low speed operating zone to the high speed operating zone.

FIG. 4 shows a functional construction of the control unit 80 and associated control elements and the engine 21. In the figure, first and second basic control amount operational means 81 and 82 calculate each of basic control amounts BASE 1 and BASE 2 of the duty value for driving each of the electromagnetic valves 57 and 77 by carrying out a table look-up in accordance with the intake air flow rate Qa detected by the air flow meter 31 and inputted to the control unit 80 as one of the operation parameters.

The electromagnetic valve 57 is opened in accordance with the basic control amount BASE 1 and the supercharge pressure is controlled toward a preset value of the target supercharge pressure, e.g., 375 mmHg through the actuator 50 and the movable tongue member 45. Similarly, the electromagnetic valve 77 is opened in accordance with the basic control amount BASE 2 and the supercharge pressure is controlled toward the preset value of the target supercharge pressure through the actuator 70 and the exhaust bypass valve 60. More specifically, each of the duty values for driving the electromagnetic valves 57 and 77 has been calculated in advance by experiments against the intake air flow rate Qa and the data thus obtained have been stored in the ROM of the microprocessor not shown. Then, suitable duty values necessary for each of the operating conditions of the engine 21 can be calculated by a table look-up operation so as to keep track of the actual supercharge pressure to the preset supercharge pressure valves.

FIG. 5 shows one example of the characteristic curves of a look-up table of the duty values for use in the table look-up operation in which the solid line indicates the BASE 1 and the dotted line indicates the BASE 2, the corresponding data of which have also been stored in the ROM. The basic control amount BASE 1 is set up in a zone defined above the value of the air flow rate Qa1, while the basic control amount BASE 2 is set up in a zone defined above the value of the air flow rate Qa2 (Qa2>Qa1).

Turning back to FIG. 4, a feedback control is performed in order to cancel a standing deviation based on different dispersion factors. Deviation calculating means 83 comprising a subtractor calculates the deviation $\Delta P$ ($\Delta P = P$ set $- P2$) between the actual supercharger pressure P2 detected by the supercharge pressure sensor 33 and a preset supercharge pressure P set. Correction amount operational means for calculating each feedback correction amount consists of proportional portion calculating means 84 and intergral portion calculating means 86 in the proportional and integral control for the moving tongue member 45 (FIG. 4), and consists of proportional portion calculating means 85 and integral portion calculating means 87 for the control of the exhaust bypass valve 60. Namely, the proportional portion calculating means 84 and 85 calculate the proportional portion PORP1 = K1. $\Delta P$ (where K1 indicates a constant) and the proportional portion PROP2 = K2. $\Delta P$ (where K2 also indicates a second constant) each having an amplitude proportional to the deviation $\Delta P$, while the integral portion calculating means 86 and 87 calculate respectively the integral portion INT1 = K3.$\Sigma \Delta P$ (where K3 indicates a third constant) and another integral portion INT 2 = K4.$\Sigma \Delta P$ (where K4 indicates a fourth constant), each having an amplitude proportional to the integral value of the deviation $\Delta P$.

Adders 88 and 90 as correction calculating means add the the first proportional portion and integral portion PROP1 and INT1 to the first basic control amount BASE1 and the second proportional and integral portions PORP2 and INT2 to the second basic control amount BASE2, respectively. With this adding operation, the feedback control for cancelling the standing deviation can be realized and the actual supercharge pressure can also be controlled to the preset supercharge pressure by the two control loops.

Operation zone determining means 92 determines the operation zone to be integral-controlled by the two control loops in accordance with the detected intake air flow rate Qa representative of one of the operating conditions of the engine 21 and the actual supercharge pressure P2 detected by the supercharge pressure sensor 33. The operation zone is set up in such that integral control is performed by the movable tongue member 45 in the zone above a predetermined value close to the preset supercharge pressure, e.g. 320 mmHg and less than the predetermined intake air flow rate Qa2, or integral control is also carried out by the exhaust bypass valve 60 in a zone above the supercharge pressure and above a predetermined intake air flow rate Qa2.

Switching means 93 through 96 as On/Off means pass or block each output from the calculating means 84 through 87 by turning on and off their switching contacts in accordance with the result of the determination described above. In this case, in the operation zone where integral control is performed on the movable tongue member 45, the switching means 95 is closed while in operation zone where integral control is performed on the bypass value, the switching means 96 is closed. The switching means 93 and 94 are always closed in the operation zone where the feedback control is performed. In this manner, according to the present invention, the operation zone is separated into one zone where integral control is carried out on the movable tongue member 45 and another zone where integral control is carried out on the exhaust bypass valve 60.

Now, operation of the supercharge pressure control apparatus for the turbocharger will be explained with reference to the program control flow chart shown in FIG. 6.

After starting the control, the intake air flow rate Qa detected by the air flow meter 31 and the supercharge pressure P2 detected by the supercharge pressure sensor 33 are read out in step S1, and operation moves to step S2 where each of the basic control amounts BASE1 and BASE2 of the duty values for the electromagnetic valves 57 and 77 are sought by the table look-up operation in accordance with the air flow rate Qa. After this operation, the operation now moves to the step S3 where the deviation $\Delta P = Pset - P2$ between the peset supercharge pressure P set and the actual supercharge pressure P2 is calculated and the operation moves to the step S4 where the proportional portions PROP1=K1. $\Delta P$ and PROP2=K2. $\Delta P$ are calculated in accordance with the deviation $\Delta P$ thus obtained. After this calculation, the operation now moves to the step S5 where a decision or determination is made if the actual supercharge pressure P2 detected is larger than a predetermined value e.g. 320 mmHg close to the preset supercharge pressure. If the result of the decision in the step S5 is YES, that is, when P2 is larger than the predetermined value of 320 mmHg, the operation moves to step S9 where another decision is made whether or not the actual intake air flow rate Qa is larger than a predetermined value Qa2 of the preset supercharge pressure.

If the result of the decision in the step S9 is NO, i.e., Qa<Qa2, the operation now moves to the step S10 where the integral portion INT1 (=K3.$\Sigma\Delta P$) is calculated in accordance with the deviation $\Delta P$, as the operation is in the zone where the integral control should be made by the movable tongue member 45. After this calculation, the operation moves to the step S11 where the integral portion INT1 thus obtained is limited to a certain range of values so as not to be excessively large. After this operation, the program step goes to the next step S7. On the other hand, if the result of the decision in the step S9 is YES, i.e. Qa>Qa2, the operation now moves to the step S12 where the integral portion INT2 (=K4.$\Sigma\Delta P$) is calculated in accordance with the deviation $\Delta P$ as the operation should be in the zone where the integral-control should be performed on the exhaust bypass valve 60. After this calculation, the operation now moves to the step S13 where a similar limiting step to that effected in the step S11 is carried out an the integral portion INT2 thus obtained so as to prevent the value INT2 from being excessively large. After this operation, the program goes to the next step S7.

Now, turning back to the decision in the step S5, if the result of the decision is NO, i.e., P2>320 mmHg, the operation moves to the next step S6 where the INT1 and INT2 are set at zero, respectively and no calculation is carried out in this step with respect to the integral portions, i.e., INT1=0 and INT2=0 and the operation moves to the next step S7.

In the step S7, the first proportional and integral portions PROP1 and INT1 are added to the first basic control amount BASE1 and a final duty value OUT 1=BASE1+PORP1+INT1 is calculated. Also, the second proportional and integral portions PROP2 and INT2 are added to the second basic control amount BASE2 and the final duty value OUT 2=BASE2+PROP2+INT2 is also calculated in the step S7. After these calculations, the operation now moves to the step S8 where the duty values of OUT 1 and OUT2 are produced, and the control signals are applied to the electromagnetic valves 57 and 77 for driving these values respectively under the proportional and integral control.

By way of example, an actual engine operation will now be explained with reference to FIG. 7, where changes in the degree of opening of the throttle valve 32, the actual intake air flow rate Qa, the actual supercharge pressure P2, and the duty value OUT1 for the electromagnetic valve 57 and the duty value OUT2 for the electromagnetic valve 77 are shown with the time elapsed.

Figure 7:
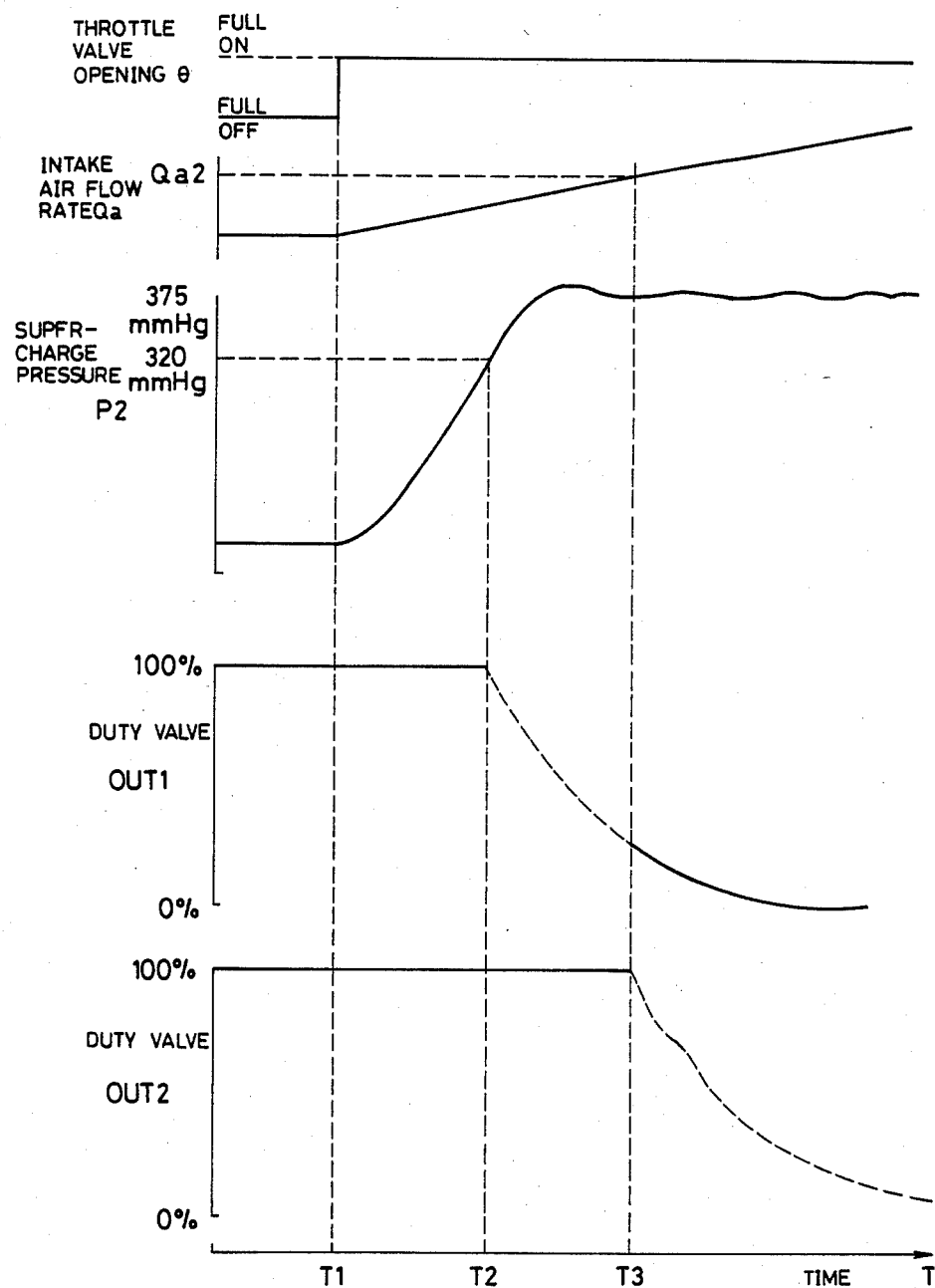
FIG. 7 illustrates an operation timing chart for the opening of the throttle valve, intake air flow rate, supercharge pressure, and duty values of control signals with the time elapsed.

When the accelerator (not shown) is operated at time T1 and acceleration is started, the actual supercharge pressure P2 increases gradually as shown in FIG. 7 and the proportional control is performed for both the movable tongue member 45 and the exhaust bypass valve 60 until the pressure P2 reaches the predetermined value of 320 mmHg. Within this range or zone, the proprotional portions of PROP1 and PROP2 are relatively large positive values and, in addition, the basic control amounts of both BASE1 and BASE2 are also large as shown in FIG. 1. Accordingly, the sum of the PROP1 and BASE1 as well as the PROP2 and the BASE2 will exceed 100 percent. When the sum exceeds 100 percent, each of the duty values OUT1 and OUT2 is controlled to 100 percent, so as to increase the supercharge pressure as much as possible.

In the zone after the time point T2, the integral control is added until it reaches the time point T3 where the actual air flow rate Qa reaches the preset air flow rate Qa2, during which the integral control is carried out only by the movable tongue member 45 in accordance with a control signal having the duty OUT1, with the result that the actual supercharge pressure P2 is controlled to a large predetermined value of 375 mmHg as the preset supercharge pressure in accordance with the rather significant control amount due to the integral portion of the INT1.

However, when time T3 has elapsed, the actual air flow rate Qa now becomes larger than the predetermined value of Qa2 and the integral control is added only to the exhaust bypass valve 60 in accordance with a second control signal having the duty OUT2, with a rather significant control amount of INT2 being added thereto, with the result that the actual supercharge pressure P2 is controlled to the predetermined value of 375 mmHg as the preset supercharge pressure. In FIG. 7, with respect to the OUT1 and OUT2, the solid line indicates the zone where only the proportional control is carried out and the dotted line indicates the zone where the proportional plus integral control is carried out.

According to the present invention, each integral control having a significant control amount is carried out respectively by the two control means in the vicinity of a predetermined value as the preset supercharge pressure. In this case, however, since the operation zones to be controlled are separated into independent zones, an optimum feedback control to the target or preset supercharge pressure can be carried out in accordance with the integral portion having a rather significant control amount in each operation zone.

Consequently, in the supercharge pressure control according to the present invention, it is possible to avoid an interference in overlapping zones. Without the present invention, one control will interfere with the other control in the overlapping zones of the two controls when two control means are used independently. Thus, according to the present invention it is possible to maintain each of high control accuracies which have been independently set up in each control means.

Furthermore, according to the present invention, the proportional control is separated from the integral control and a feedback control using the proportional portion is started in a relatively low speed operation zone. In this case, since the difference between the actual and the preset supercharge pressures is large in the low speed operation zone and the proportional control is performed in the area based on the relatively large difference, the supercharge pressure has a good response and can rise promptly.

According to the present invention, after passing by the low speed operation zone, the integral control begins to be carried out after the proportional control. In the zone close to the preset supercharge pressure where the integral control is performed, optimum feedback control can be carried out up to the preset supercharge pressure. As a result, the degrading influence of the integral control on the low speed operation zone, which otherwise occurs according to the prior art, is avoided. That is, the disadvantage in starting the integral control early is avoided. The earlier the feedback control starts, the larger the integral portion becomes. Thus, the continuous control based on the large integral portion in the area close to the preset supercharge pressure causes the correction amount to be unnecessarily large, even when the difference between the actual supercharge pressure and the preset supercharge pressure is small, and this in turn causes an overshoot control of the actual supercharge pressure beyond the preset supercharge pressure due to the excessive correction amount. This type of operation is prevented according to the present invention.

Moreover, because the proportional control is always performed in the control system, the switching on i.e., start of the integral control, can smoothly be carried out.

As described in the foregoing, according to the present invention, each feedback control is made in such a manner that the capacity changing member for changing the exhaust gas amount to the exhaust turbine and the exhaust bypass valve are independently controlled in accordance with the operating conditions of the engine and in accordance with the actual supercharge pressure detected and selection is made of the zone where the control is carried out by the capacity changing member and the another zone where the control is carried out by the exhaust bypass valve, in accordance with the result of determinations through determination means for determining each operation zone to be feedback-controlled thus avoding any overlapped conditions of the control to occur and realizing the improvement of the feedback control accuracy over a wide range of the operation zones.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A method of controlling supercharge pressure for a turbocharger which comprises the steps of:
    (a) seeking basic control amounts of BASE1 and BASE2 from a look-up table in accordance with an intake air flow rate Qa;
    (b) calculating the deviation $\Delta P = P\ set - P2$ between a preset supercharge pressure P set and the actual supercharge pressure P2 detected and obtaining each of proportional values $PROP1 = K\Delta P$ and $PROP2 = K2. \Delta P$, where K1 and K2 indicate a first and a second constant, respectively, from the deviation $\Delta P$ thus obtained;
    (c) determining if the actual supercharge pressure P2 is larger than a predetermined value of the supercharge pressure;
    (d) determining if the actual air flow rate Qa is larger than a predetermined value of Qa2, from the result of said first mentioned determination;
    (e) selectively calculating each of intergral values $INT1 = K3.\Sigma\Delta P$ and $INT2 = K4.\Sigma\Delta P$, where K3 and K4 indicate a third and forth constant, respectively;
    (f) further selectively calculating each of duty values $OUT1 = BASE1 + PROP1 + INT1$ and $OUT2 = BASE2 + PROP2 + INT2$ in accordance with the result of said first and second mentioned determinations; and
    (g) selectively controlling first and second electromagnetic valves for a capacity changing means and an exhaust bypass valve means in accordance with first and second control signals having the duty values thus calculated.

2. The method as set forth in claim 1 wherein the method further comprises the step of limiting the integral control amounts INT1 and INT2 within a predetermined values, respectively.

3. The method as set forth in claim 1 wherein said predetermined value of the supercharge pressure is 320 mmHg.

4. The method as set forth in claim 1 wherein said preset supercharge pressure P set is 375 mmHg.

5. A method of controlling supercharge pressure for a turbocharger of an engine which comprises the steps of:
    (a) setting up a first predetermined value of supercharge pressure close to but below a preset supercharge pressure (P set);

(b) independently performing a proportional control of a capacity changing means for controlling exhaust gas flow to a turbine of a turbocharger and a proportional control of an exhaust bypass valve for bypassing exhaust gas flow around said turbine in a first control zone beginning from a time point (T1) at which an accelerator is operated until an actual supercharge pressure reaches said first predetermined value in accordance with first and second control signals having duty values of OUT1 OUT2;

(c) performing a proportional plus integral control of only said capacity changing means for the turbine in a second control zone beginning from the first predetermined value until an actual air flow rate to said engine reaches a first predetermined air flow rate in accordance with the first control signal, with the proportional control being maintained at the exhaust bypass valve in response to the second signal; and (d) performing the proportional plus integral control of only said exhaust bypass valve in a third control zone after reaching said predetermined air flow rate in accordance with the second control signal, with the proportional control being maintained for the capacity changing means in response to the first control signal.

6. The method as set forth in claim 5 wherein said first predetermined value is 320 mmHg and said preset supercharge pressure is 375 mmHg.

7. A supercharge pressure control apparatus for a turbocharger which comprises:

(a) a plurality of detecting means for detecting a plurality of operating conditions of the engine including crank angle, air flow rate, supercharge pressure, and throttle valve opening;

(b) capacity changing means provided at a guide path of an exhaust pipe and having a shaft member coupled through arm and rod means to a first actuator;

(c) an exhaust bypass valve provided at an exhaust manifold and having linkage means coupled to a second actuator;

(d) a first electromagnetic valve provided at a first liaison pipe for controlling said first actuator in accordance with a first control signal having a duty value of OUT1;

(e) a second electromagnetic valve provided at a second liaison pipe for controlling said second actuator in accordance with a second control signal having a duty value of OUT2; and (f) an electronic control unit having a microprocessor including a CPU, a ROM, a RAM, an A/D converter, and an input/output interface for producing said first and second control signals and for selectively controlling said first and second electromagnetic values in accordance with the operating conditions of the engine detected by said plurality of detecting means.

8. The supercharge pressure control apparatus as set forth in claim 7 wherein various numerical data are stored in the ROM as a control program.

9. The supercharge pressure control apparatus as set forth in claim 7 wherein a look-up table relating to basic control amounts to the intake air flow rate is stored in the ROM.

10. A supercharge pressure control apparatus for a turbocharger of an engine which comprises:

(a) means for detecting operating conditions of the engine;

(b) supercharge detecting means for detecting supercharge pressure;

(c) deviation calculating means for calculating the deviation between the actual supercharge pressure detected and a preset supercharge pressure;

(d) first and second control amount operational means for calculating each of the control amounts for a capacity changing means and for an exhaust bypass valve means in accordance with parameters including the deviation and the operating conditions of the engine; and (e) operation zone determining means for determining a particular operation zone in which a feedback control is performed, so as to selectively calculate the control amount in either one of said first and said second control amount operational means in accordance with the deviation, based on the result of the determination.

11. The supercharge pressure control apparatus as set forth in claim 10 wherein among calculations of the control amounts corresponding to the deviation, only the calculation of an integral portion proportional to the integral value of the deviation is selectively performed either in said first control amount operational means or in said second control amount operational means in accordance with the result of the determination in said operation zone determining means.

12. A supercharge pressure control apparatus for a turbocharger as claimed in claim 10 wherein said operating condition detecting means comprises a plurality of detecting devices for detecting operating conditions of the engine including engine speed, air flow rate and throttle valve opening, said capacity changing means being provided in an exhaust pipe of the engine and having a shaft member coupled to a first actuator for actuating the shaft member to control the supercharge pressure, said exhaust bypass valve means being provided in an exhaust manifold of the engine and coupled to a second actuator for actuating the exhaust bypass valve means to control the supercharge pressure, said supercharge pressure control apparatus further comprising a first electromagnetic valve for controlling said first actuator, a second electromagnetic valve for controlling said second actuator, and an electronic control unit for selectively controlling said first and second electromagnetic valves in accordance with the operating conditions of the engine detected by said plurality of detecting devices.

13. The supercharge pressure control apparatus as set forth in claim 12, wherein a look-up table relating the basic control amounts to the intake air flow rate is stored in the control unit.

* * * * *